(12) United States Patent
Cho

(10) Patent No.: US 10,963,711 B2
(45) Date of Patent: Mar. 30, 2021

(54) APPARATUS, SYSTEM AND METHOD FOR RECOGNIZING OBJECT OF VEHICLE

(71) Applicants: HYUNDAI MOTOR COMPANY, Seoul (KR); KIA MOTORS CORPORATION, Seoul (KR)

(72) Inventor: Dae Gil Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 134 days.

(21) Appl. No.: 16/293,436

(22) Filed: Mar. 5, 2019

(65) Prior Publication Data
US 2020/0160073 A1 May 21, 2020

(30) Foreign Application Priority Data
Nov. 20, 2018 (KR) .................. 10-2018-0143880

(51) Int. Cl.
*G06K 9/00* (2006.01)
*G06N 3/08* (2006.01)
*G06N 20/00* (2019.01)
*H04W 4/40* (2018.01)

(52) U.S. Cl.
CPC .......... *G06K 9/00825* (2013.01); *G06N 3/08* (2013.01); *G06N 20/00* (2019.01); *H04W 4/40* (2018.02)

(58) Field of Classification Search
CPC .. G06K 9/00825; G06K 9/00791; G06N 3/08; H04W 4/40
See application file for complete search history.

(56) References Cited

U.S. PATENT DOCUMENTS

| | | | |
|---|---|---|---|
| 8,837,868 B2 * | 9/2014 | Boncyk ............ | H04N 21/47815 382/305 |
| 2014/0133745 A1 * | 5/2014 | Razavi ............... | G06K 9/00791 382/160 |
| 2016/0364619 A1 * | 12/2016 | Ogata .................... | G08G 1/166 |
| 2017/0221188 A1 * | 8/2017 | Aoki ........................ | G01C 3/06 |
| 2019/0244041 A1 * | 8/2019 | Kawanai ............ | G06K 9/00825 |

FOREIGN PATENT DOCUMENTS

| KR | 10-2018-0058175 A | 5/2018 |
|---|---|---|
| KR | 10-2018-0067200 A | 5/2018 |

* cited by examiner

*Primary Examiner* — John J Lee
(74) *Attorney, Agent, or Firm* — Mintz Levin Cohn Ferris Glovsky and Popeo, P.C.; Peter F. Corless

(57) ABSTRACT

An object recognition apparatus of a vehicle includes a communication device receiving information of an object from the object, a camera capturing an image of the object, and a controller that recognizes the image of the object based on a deep learning network, and, when information from recognizing the image of the object is compared with the information of the object and then the comparison result is determined as a recognition error, transmits the image of the object and an error determination result to a server.

18 Claims, 8 Drawing Sheets

APPARATUS, SYSTEM AND METHOD FOR RECOGNIZING OBJECT OF VEHICLE

CROSS-REFERENCE TO RELATED APPLICATION

This application claims the benefit of priority to Korean Patent Application No. 10-2018-0143880, filed in the Korean Intellectual Property Office on Nov. 20, 2018, the entire contents of which are incorporated herein by reference.

TECHNICAL FIELD

The present disclosure relates to an apparatus, a system, and a method that recognize an object of a vehicle.

BACKGROUND

With the advent of autonomous vehicle, a technology in which a vehicle recognizes objects by itself is actively being developed.

A method of recognizing an object may include collecting an image of a target object, learning and storing the collected image, and then comparing the stored information with the input image. In recent years, the deep learning method has been used as a technology for recognizing an object.

SUMMARY

An aspect of the present disclosure provides an apparatus, a system, and a method for recognizing an object of a vehicle that determine the error of object recognition, include the unlearned feature, and learn the unlearned feature, in recognizing an object through the deep learning method.

According to an aspect of the present disclosure, an object recognition apparatus of a vehicle includes a communication device receiving information of an object from the object, a camera capturing an image of the object, and a controller that recognizes the image of the object based on a deep learning network, and, when information from recognizing the image of the object is compared with the information of the object and then the comparison result is determined as a recognition error, transmits the image of the object and an error determination result to a server.

According to an embodiment, the controller transmits an update request of a parameter associated with the deep learning network to the server and receives an updated parameter from the server.

According to an embodiment, the controller recognizes the object based on the deep learning network to which the updated parameter is applied.

According to an embodiment, the communication device communicates in at least one communication scheme of V2X communication, Bluetooth communication, and cellular communication.

According to an embodiment, the object includes at least one of another vehicle, infrastructure, and an electronic device, which are placed at a periphery of the vehicle.

According to an embodiment, the information of the object includes type information and location information of the object, which are received from the object.

According to an embodiment, the information from recognizing the image of the object includes type information and location information of the object determined based on the deep learning network.

According to an embodiment, the controller determines that image recognition of the object is successful, when the object recognized based on the deep learning network is present within an arbitrary region set based on the received information of the object.

According to an aspect of the present disclosure, an object recognition system of a vehicle includes an object transmitting information of the object, a vehicle that receives the information of the object and compares information from recognizing an image of the object obtained from a camera based on a deep learning network with the information of the object to determine a recognition error of the object, and a server that updates a parameter associated with the deep learning network based on the image of the object determined as the recognition error and transmits the updated parameter to the vehicle.

According to an embodiment, the vehicle transmits an update request of a parameter associated with the deep learning network to the server and receives the updated parameter from the server to apply the updated parameter to the deep learning network.

According to an embodiment, the server selects an image, which is to be used to update the parameter, of the received image of the object and learns the selected image to update the parameter.

According to an aspect of the present disclosure, an object recognizing method of a vehicle includes receiving information of an object from the object, obtaining an image of the object from a camera, recognizing the image of the object based on a deep learning network, comparing information from recognizing the image of the object with the information of the object to determine an object recognition error, and transmitting the image of the object and an error determination result to a server.

According to an embodiment, the object includes at least one of another vehicle, infrastructure, and an electronic device, which are placed at a periphery of the vehicle.

According to an embodiment, the information of the object includes type information and location information of the object.

According to an embodiment, the object communicates in at least one manner of V2X communication, Bluetooth communication, and cellular communication.

According to an embodiment, the information from recognizing the image of the object includes type information and location information of the object determined based on the deep learning network.

According to an embodiment, the method further includes determining that image recognition of the object is successful, when the object recognized based on the deep learning network is present within an arbitrary region set based on the received information of the object.

According to an embodiment, the method further includes updating a parameter in the server based on the image of the object and the error determination result, after the transmitting of the image of the object and the error determination result to the server.

According to an embodiment, the method further includes transmitting an update request of the parameter associated with the deep learning network and receiving the updated parameter from the server to apply the updated parameter to the deep learning network.

According to an embodiment, the method further includes recognizing the object based on the deep learning network to which the updated parameter is applied.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
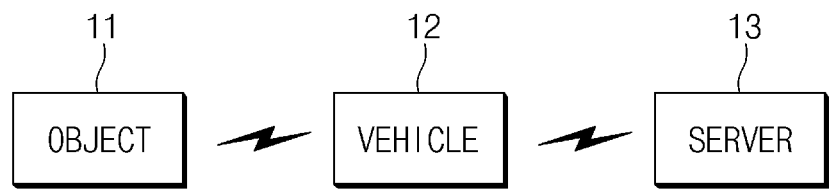
FIG. 1 is a block diagram illustrating an object recognition system of a vehicle, according to an embodiment of the present disclosure.

Hereinafter, embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

A deep learning method for recognizing an object finds patterns in a lot of images to learn the features of images. To do this, a large number of images are collected. However, since it takes a lot of time and cost to collect a large number of images, it is practically limited to collect a large amount of images to recognize all objects.

The deep learning method may have the high recognition rate of the image when the deep learning method recognizes an image having a feature similar to that of the already learned image. However, the deep learning method fails to learn an image that has not been collected. The deep learning method does not recognize the object accurately, when recognizing the image not learned.

Accordingly, it is urgent to develop a technology for collecting and learning images having features different from those of the previously learned image.

FIG. 1 is a block diagram illustrating an object recognition system of a vehicle, according to an embodiment of the present disclosure.

As illustrated in FIG. 1, an object recognition system of a vehicle according to an embodiment of the present disclosure may include an object 11, a vehicle 12, and a server 13.

The object 11 may include at least one of other vehicles, infrastructure, and electronic devices, which are placed at a periphery of the vehicle 12.

The object 11 may perform V2X communication, Bluetooth communication, Wi-Fi communication, or cellular (LTE, ex, C-V2X) communication with the vehicle 12.

The object 11 may transmit information of an object to the vehicle 12. The information of an object may include type information of the object and location information of the object.

In more detail, the object 11 may perform at least one of cellular communication and V2X communication with the vehicle 12, when the object 11 is a vehicle or infrastructure; the object 11 may transmit type information and location information of another vehicle or infrastructure, which is placed at a periphery of a vehicle, to the vehicle 12 through at least one communication of the cellular communication and the V2X communication.

The object 11 may perform Bluetooth communication or Wi-Fi communication with the vehicle 12, when the object 11 is an electronic device; the object 11 may transmit type information and location information of the electronic device to the vehicle 12 by using the Bluetooth communication or the Wi-Fi communication.

The vehicle 12 may receive the information of an object from the object 11. The information of an object may include type information of the object and location information of the object.

Upon receiving the information of an object, the vehicle 12 may perform V2X communication, Bluetooth communication, Wi-Fi communication, or cellular (LTE, ex, C-V2X) communication with the object 11. Moreover, the vehicle 12 may perform cellular communication with the server 13.

The vehicle 12 may obtain the image of an object by using the camera included in a vehicle and may recognize the image of the object based on the deep learning network pre-stored in the vehicle.

The vehicle 12 may determine an object recognition error by comparing information of the object received from the object 11 with information from recognizing the image of the object obtained from the camera.

In more detail, the vehicle 12 may determine the object recognition error, when the object recognized based on the deep learning network is not present within an arbitrary region set based on information (the location of the object) received from the object 11.

The vehicle 12 may transmit the image of the object and the error determination result to the server 13, when determining the recognition error of the object.

The vehicle 12 may receive the updated parameter from the server 13, when a parameter update is present in the server 13; the vehicle 12 may make a request for the updated deep learning parameter to the server 13 and may receive the updated deep learning parameter, when determining that the parameter update is required.

The vehicle 12 may determine that the parameter update is required, when a predetermined period has elapsed or when the vehicle 12 is driving a route on which the vehicle 12 has not traveled.

The vehicle 12 may apply the updated parameter to the deep learning network to recognize the object. Accordingly, it is possible to overcome the recognition error and to improve the recognition accuracy of the object.

The server 13 may store the same as the deep learning network stored in the vehicle 12.

The server 13 may receive the image of the object and the error determination result from the vehicle 12, may select an image, which is to be used for learning, from among the received images of the object, and may learn the selected image to update the parameter associated with the deep learning network. Since the server 13 selects an image, which is to be used for learning, from among images of the object received from the vehicle, it is not necessary to collect all images of the object obtained by the vehicle. Therefore, the cost may be saved.

The server 13 may transmit the updated parameter in response to the request of the vehicle 12.

Figure 2:
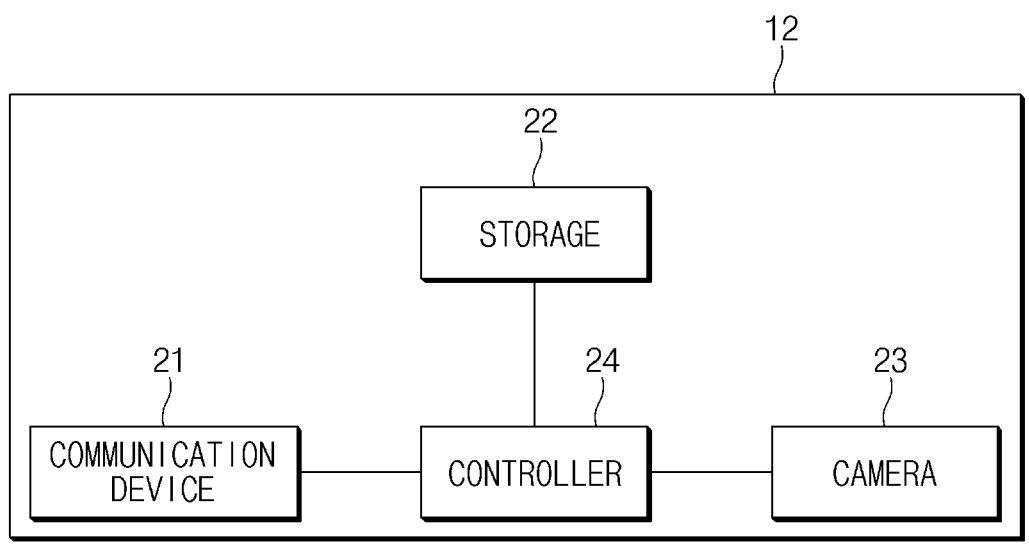
FIG. 2 is a block diagram illustrating an object recognition apparatus of a vehicle, according to an embodiment of the present disclosure.

FIG. 2 is a block diagram illustrating an object recognition apparatus of a vehicle, according to an embodiment of the present disclosure.

As illustrated in FIG. 2, an object recognition apparatus of a vehicle may include a communication device 21, storage 22, a camera 23, and a controller 24.

The communication device 21 may perform V2X communication, Bluetooth communication, Wi-Fi communication, or cellular (LTE, ex, C-V2X) communication with the object 11. Moreover, the communication device 21 may perform cellular communication with the server 13.

The communication device 21 may perform at least one of cellular communication and V2X communication with the object 11, when the object 11 is a vehicle or infrastructure; the communication device 21 may receive type information and location information of another vehicle or infrastructure, which is placed at a periphery of a vehicle, through at least one communication of the cellular communication and the V2X communication.

The communication device 21 may perform Bluetooth communication or Wi-Fi communication with the object 11, when the object 11 is an electronic device; the communication device 21 may receive type information and location information of the electronic device by using the Bluetooth communication or the Wi-Fi communication.

The communication device 21 may transmit the image of an object and the error determination result to the server 13, may transmit information for making a request for an updated parameter associated with the deep learning network to the server 13, and may receive the updated parameter from the server 13.

The storage 22 may store the deep learning network.

The storage 22 may include at least one storage medium of a flash memory, a hard disk, a memory card, a Read-Only Memory (ROM), a Random Access Memory (RAM), an Electrically Erasable Programmable Read Only Memory (EEPROM), a Programmable Read-Only Memory (PROM), a magnetic memory, a magnetic disk, or an optical disc.

The camera 23 may capture objects at a periphery of the vehicle while the vehicle is driving.

The controller 24 may control overall operations of an object recognition apparatus of a vehicle.

The controller 24 may recognize the object image obtained from the camera 23, based on the deep learning network. In embodiments, the controller 24 may determine the type of an object currently obtained, based on the deep learning network, and may estimate the location of the object by calculating the distance between a vehicle and an object.

The controller 24 may recognize the image of the object obtained from the camera 23 based on the deep learning network when not receiving information of the object from the object 11, and then may determine that the recognition is successful.

In the meantime, the controller 24 may compare the received information of the object with information from recognizing the image of the object obtained from the camera 23 based on the deep learning network to determine whether the recognition of the object image is successful, when receiving the information of the object from the object 11.

For example, the controller 24 may set an arbitrary region (e.g., circle) based on information (e.g., location information) received from the object and may determine whether the object recognized based on the deep learning network is present within the arbitrary region.

The controller 24 may determine the recognition error when the object recognized based on the deep learning network is not present within the arbitrary region set based on the information received from the object.

The controller 24 may determine whether the recognition is successful, when determining that the recognized object the same as the received object information is present within the arbitrary region set based on the received object.

The controller 24 may set an arbitrary region, of which the center is the object and of which the radius is the accuracy, when it is possible to determine the location accuracy of the object when the controller 24 sets the arbitrary region based on the object.

The controller 24 may set an arbitrary region, of which the center is the object and of which the radius is a value preset for each object, when it is impossible to determine the location accuracy of the object. Herein, the preset value may be set in consideration of the performance of GPS, a communication environment, and autonomous driving situation.

According to an embodiment, the controller 24 may set the arbitrary region, the radius of which is 3 m, when the object is a vehicle; the controller 24 may set the arbitrary region, the radius of which is 5 m, when the object is an electronic device.

The controller 24 transmits the image of the object and the error determination result to the server 13, when determining the recognition error of the object. Herein, the image of the object may mean a buffering image that is matched with information of the object determined as the recognition error.

The controller 24 may receive a parameter, which is learned and updated based on the image of an object and the error determination result, from the server 13.

The controller 24 may apply the updated parameter to the deep learning network to recognize an object, thereby improving the recognition rate of the object.

Figure 3:
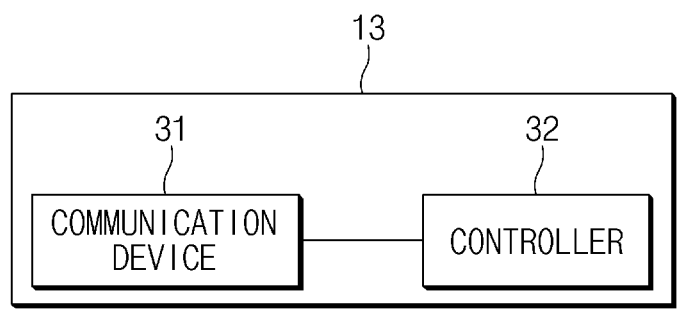
FIG. 3 is a block diagram illustrating a server, according to an embodiment of the present disclosure.

FIG. 3 is a block diagram illustrating a server, according to an embodiment of the present disclosure.

As illustrated in FIG. 3, a server according to an embodiment of the present disclosure may include a communication device 31 and a controller 32.

The communication device 31 may perform cellular communication with a vehicle.

The communication device 31 may receive an image of an object and an error determination result, from the vehicle.

The controller 32 may select an image, which is to be used for learning, from among received images of the object, when receiving the image of an object and the error determination result from the vehicle.

For example, the controller 32 may exclude an image from images to be used for learning, when the image, which is captured while things other than the object overlap with the object, is included among the received images.

The controller 32 may learn an image selected from the received images to update a parameter associated with the previously generated deep learning network.

The controller 32 may allow the updated parameter to be transmitted to a vehicle, when receiving a request for the update of a parameter from the vehicle.

Figure 4:
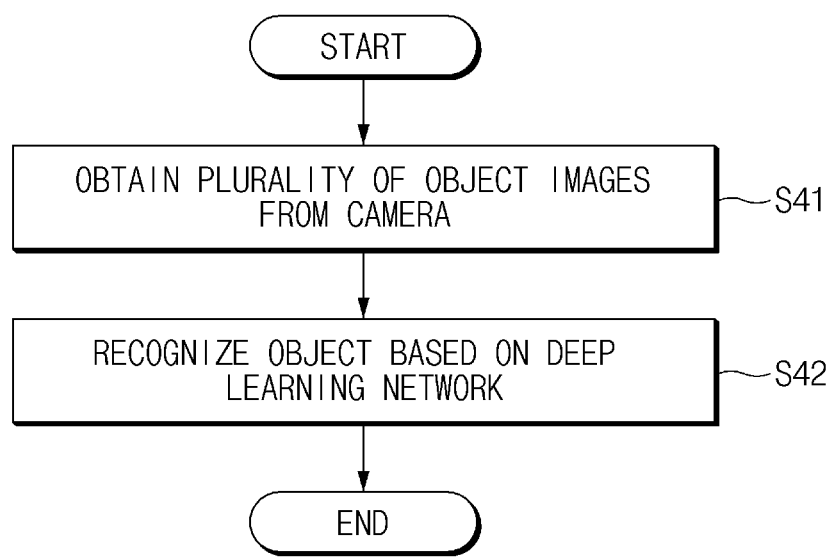
FIG. 4 is a flowchart illustrating an object recognizing method of a vehicle, according to an embodiment of the present disclosure.

FIG. 4 is a flowchart illustrating an object recognizing method of a vehicle, according to an embodiment of the present disclosure.

According to an embodiment of the present disclosure with reference to FIG. 4, an object recognizing method of a vehicle will be described when information of an object is not received from an object.

As illustrated in FIG. 4, in operation S41, the controller 24 obtains an object image from the camera 23.

In operation S42, the controller 24 recognizes an object obtained by using the camera 23, based on a deep learning network.

In operation S42, since the controller 24 does not receive the information of an object from the object 11, there is no comparison target for determining whether the deep learning network-based object recognition is made correctly. Accordingly, it may be determined that the deep learning network-based object recognition is made accurately.

Figure 5:
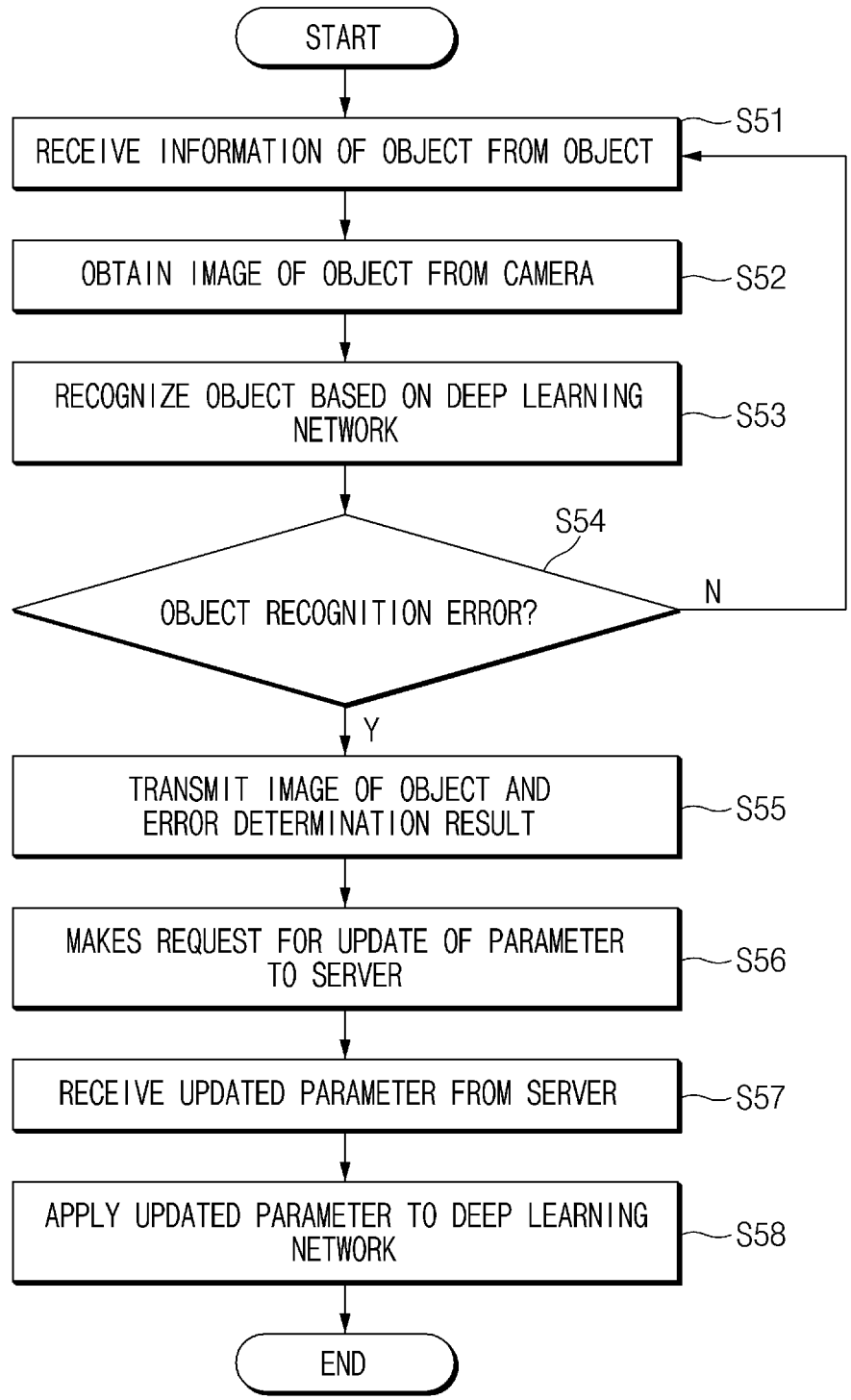
FIG. 5 is a flowchart illustrating an object recognizing method of a vehicle, according to another embodiment of the present disclosure.

FIG. 5 is a flowchart illustrating an object recognizing method of a vehicle, according to another embodiment of the present disclosure.

According to an embodiment of the present disclosure with reference to FIG. 5, the object recognizing method of a vehicle will be described when information of an object is received from an object.

As illustrated in FIG. 5, in operation S51, the controller receives information of an object from the object 11. The information of an object received in operation S51 may include type information of the object and location information of the object.

In operation S52, the controller 24 obtains the image of the object from the camera 23. The image of an object obtained in operation S52 may be used to determine the type and location of an object, for example, to recognize the object.

In operation S53, the controller 24 recognizes the object obtained from the camera 23, based on the deep learning network.

In operation S53, the controller 24 may recognize the object based on the deep learning network, may calculate the distance between a vehicle and the object, and may estimate the location of the object.

In operation S54, the controller 24 may determine an object recognition error by comparing information from recognizing the image of the object based on the deep learning network with the information of the object received from the object.

In operation S55, the controller 24 transmits the image of the object and the error determination result to the server 13, when determining that an error is present in object recognition (Y) in operation S54.

Meanwhile, the controller 24 performs operation S51, when the controller 24 determines that there is no error in the deep learning network-based object recognition (i.e., success) (N) in operation S54.

In operation S56, the controller 24 makes a request for the update of a parameter associated with the deep learning network, to the server 13.

In operation S57, the controller 24 receives the updated parameter from the server 13.

In operation S58, the controller 24 applies the updated parameter to the deep learning network.

In embodiments, after operation S58, the controller 24 may further perform recognizing the image of the object based on the deep learning network to which the updated parameter is applied, thereby improving the recognition rate of the object.

Figure 6:
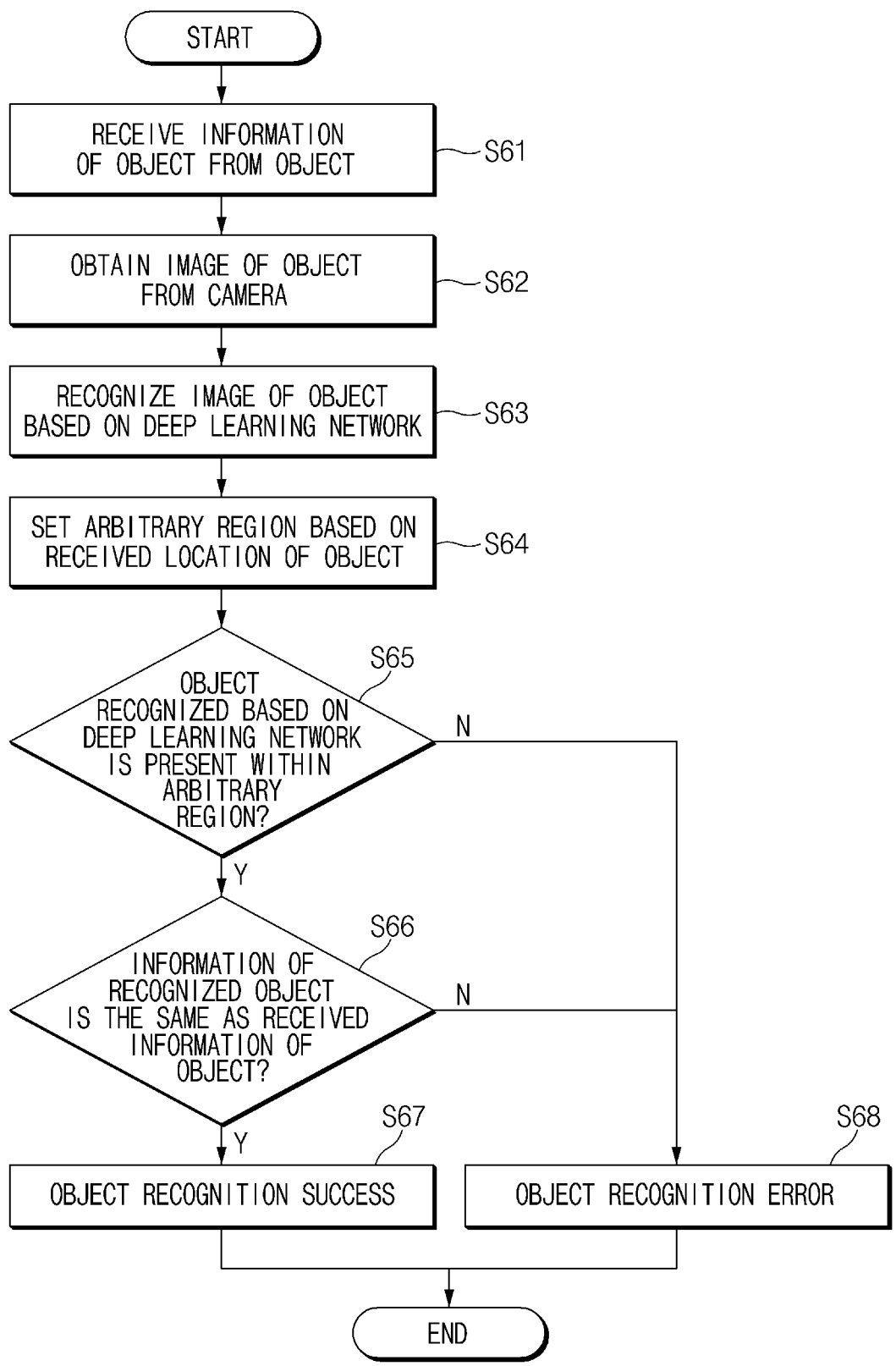
FIG. 6 is a flowchart illustrating a method for learning an object, according to another embodiment of the present disclosure.

FIG. 6 is a flowchart illustrating a method for learning an object, according to another embodiment of the present disclosure.

In operation S61, the controller 24 receives information of an object from the object.

In operation S62, the controller 24 obtains the image of the object from the camera 23.

In operation S63, the controller 24 recognizes the image of the object based on a deep learning network.

In operation S64, the controller 24 sets an arbitrary region (e.g., circle) based on information (e.g., location information) received from the object.

In operation 64, the controller 24 may set an arbitrary region, of which the center is the object and of which the radius is the accuracy, when it is possible to determine the location accuracy of the object when the controller 24 sets the arbitrary region based on the object.

In operation 64, the controller 24 may set an arbitrary region, of which the center is the object and of which the radius is a value preset for each object, when it is impossible to determine the location accuracy of the object. Herein, the preset value may be set in consideration of the performance of GPS, a communication environment, and/or autonomous driving situation.

In operation S64, according to an embodiment, the controller 24 may set the arbitrary region, the radius of which is 3 m, when the object is a vehicle; the controller 24 may set the arbitrary region, the radius of which is 5 m, when the object is an electronic device.

In operation S65, the controller 24 determines whether the object recognized based on the deep learning network is present within the arbitrary region.

In operation S68, the controller 24 determines an object recognition error, in operation S65, when information of the object recognized based on the deep learning network is not present within the set arbitrary region (N).

In the meantime, in operation S66, the controller 24 determines whether the information of the object recognized in operation S63 based on the deep learning network is the same as the information of an object received in operation S61, in operation S65, when information of the object recognized based on the deep learning network is present within the set arbitrary region (Y).

In operation S66, the controller 24 may determine object recognition success, when determining that the information of the object recognized in operation S63 based on the deep learning network is the same as the information of an object received in operation S61 within the arbitrary region (Y).

In operation S68, the controller 24 determines an object recognition error, when determining that the information of the object recognized in operation S63 based on the deep learning network is not the same as the information of an object received in operation S61 within the arbitrary region (N).

Figure 7:
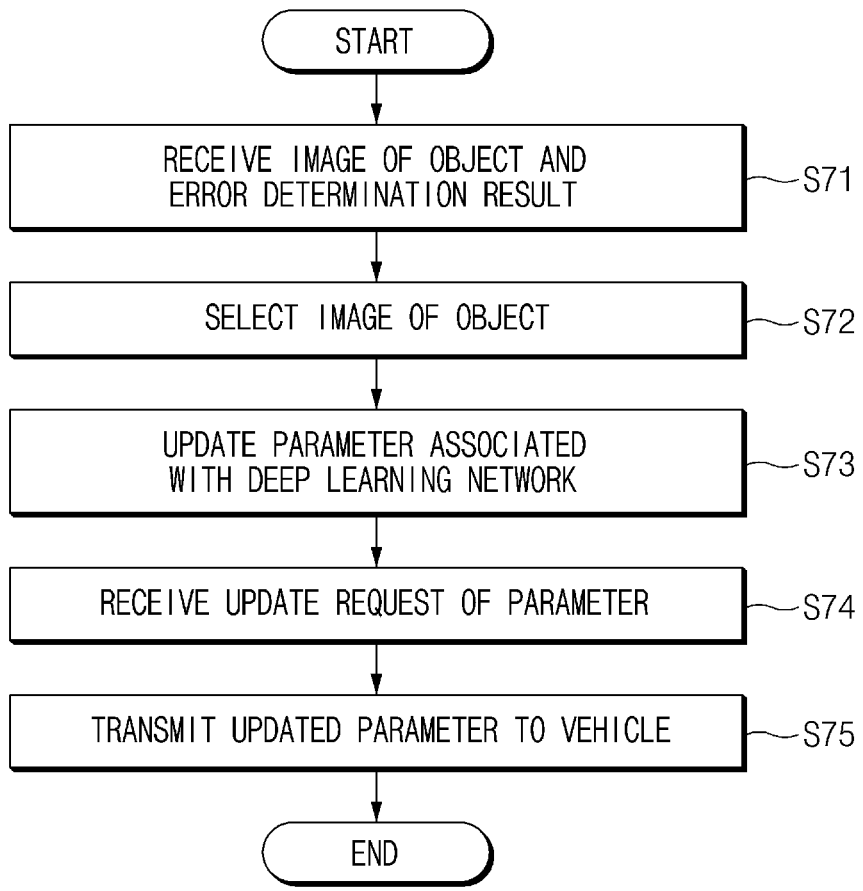
FIG. 7 is a flowchart illustrating an object learning method of a server, according to an embodiment of the present disclosure.

FIG. 7 is a flowchart illustrating an object learning method of a server, according to an embodiment of the present disclosure.

As illustrated in FIG. 7, in operation S71, the controller 32 receives the image of an object and an error determination result from the vehicle 12.

In operation S72, the controller 32 selects the image of the object.

In operation 72, the controller 32 may exclude an image from images to be used for learning, when the image, which is captured while things other than the object overlap with the object, is included among the received images.

In operation S73, the controller 32 may learn an image selected from the collected images to update a parameter associated with the deep learning network.

In operation S74, the controller 32 receives an update request of the parameter associated with the deep learning network, from the vehicle 12.

In operation S75, the controller 32 transmits the updated parameter to the vehicle 12.

Figure 8:
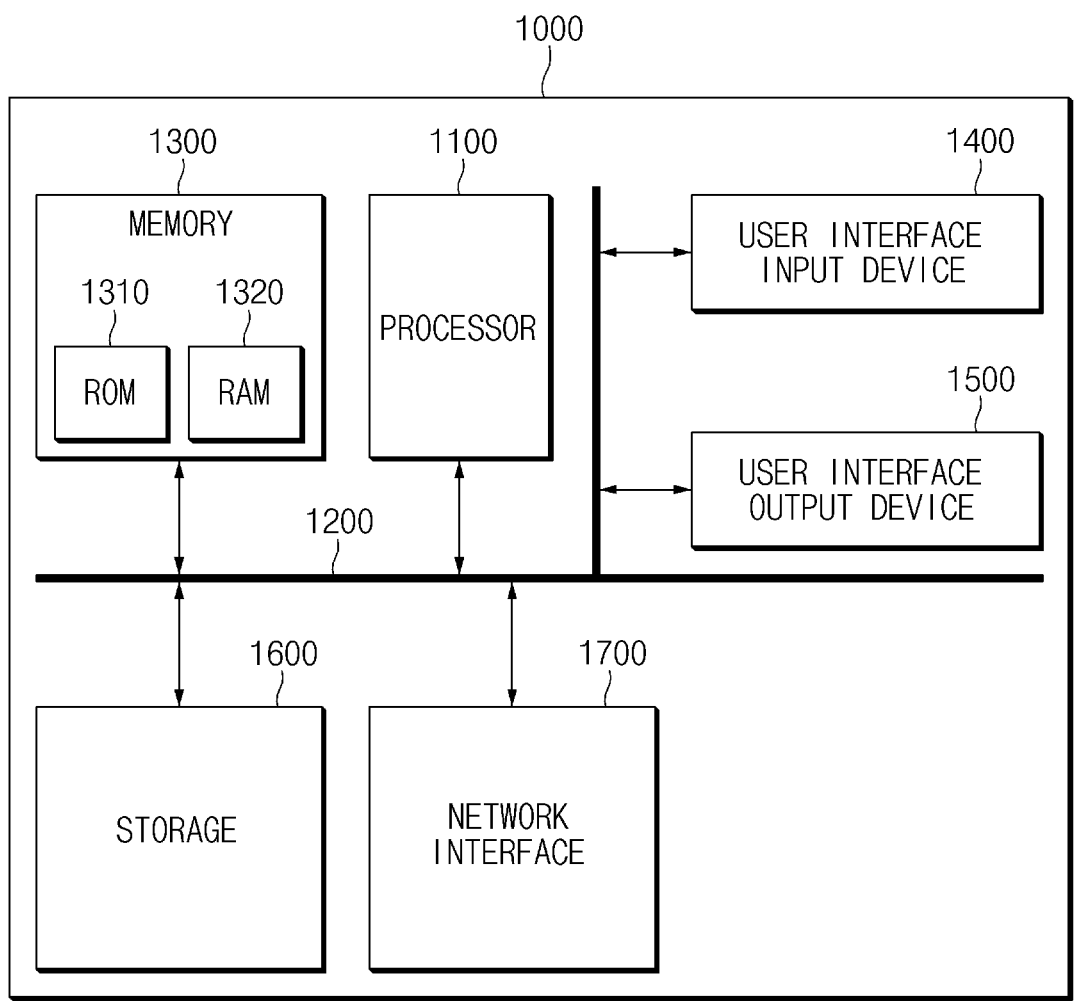
FIG. 8 is a block diagram illustrating a configuration of a computing system performing a method, according to an embodiment of the present disclosure.

FIG. 8 is a block diagram illustrating a configuration of a computing system performing a method, according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an embodiment of the present disclosure, an apparatus, a system, and a method that recognize an object of a vehicle may recognize an object through a deep learning network to which a parameter updated based on information determined as a recognition error is applied, thereby accurately recognizing an object at low cost.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An object recognition apparatus of a vehicle comprising:
   a communication device configured to receive information of an object from the object;
   a camera configured to capture an image of the object; and
   a controller, wherein the controller is configured to:
      recognize the image of the object based on a deep learning network;
      when information from recognizing the image of the object is compared with the information of the object and then the comparison result is determined as a recognition error, transmit the image of the object and an error determination result to a server; and
      receive, from the server, a parameter updated in the server based on image of the object and the error determination result.

2. The object recognition apparatus of claim 1, wherein the controller is further configured to:
   transmit an update request of a parameter associated with the deep learning network to the server;
   receive an updated parameter from the server; and
   apply the updated parameter to the deep learning network.

3. The object recognition apparatus of claim 1, wherein the controller is further configured to:
   recognize the object based on the deep learning network to which the updated parameter is applied.

4. The object recognition apparatus of claim 1, wherein the communication device is configured to communicate in at least one communication scheme of V2X communication, Bluetooth communication, and cellular communication.

5. The object recognition apparatus of claim 4, wherein the information from recognizing the image of the object includes type information and location information of the object determined based on the deep learning network.

6. The object recognition apparatus of claim 1, wherein the object includes at least one of another vehicle, infrastructure, and an electronic device, which are placed at a periphery of the vehicle.

7. The object recognition apparatus of claim 6, wherein the controller is configured to:
determine that image recognition of the object is successful, when the object recognized based on the deep learning network is present within an arbitrary region set based on the received information of the object.

8. The object recognition apparatus of claim 1, wherein the information of the object includes type information and location information of the object, which are received from the object.

9. An object recognition system of a vehicle comprising:
an object configured to transmit information of the object;
a vehicle, wherein the vehicle is configured to: receive the information of the object; and
compare information from recognizing an image of the object obtained from a camera based on a deep learning network with the information of the object to determine a recognition error of the object; and
a server, wherein the server is configured to:
update a parameter associated with the deep learning network based on the image of the object determined as the recognition error; and
transmit the updated parameter to the vehicle,
wherein the server selects an image which is to be used to update the parameter, of the received image of the object and learns the selected image to update the parameter.

10. The object recognition system of claim 9, wherein the vehicle is configured to:
transmit an update request of a parameter associated with the deep learning network to the server; and
receive the updated parameter from the server to apply the updated parameter to the deep learning network.

11. An object recognizing method of a vehicle, the method comprising:
receiving information of an object from the object;
obtaining an image of the object from a camera;
recognizing the image of the object based on a deep learning network;
comparing information from recognizing the image of the object with the information of the object to determine an object recognition error; and
transmitting the image of the object and an error determination result to a server; and
receiving, from the server, a parameter updated in the server based on the image of the object and the error determination result.

12. The method of claim 11, wherein the object includes at least one of another vehicle, infrastructure, and an electronic device, which are placed at a periphery of the vehicle.

13. The method of claim 11, wherein the information of the object includes type information and location information of the object.

14. The method of claim 11, wherein the object communicates in at least one manner of V2X communication, Bluetooth communication, and cellular communication.

15. The method of claim 11, wherein the information from recognizing the image of the object includes type information and location information of the object determined based on the deep learning network.

16. The method of claim 11, further comprising:
determining that image recognition of the object is successful, when the object recognized based on the deep learning network is present within an arbitrary region set based on the received information of the object.

17. The method of claim 11, further comprising:
transmitting an update request of the parameter associated with the deep learning network; and
receiving the updated parameter from the server to apply the updated parameter to the deep learning network.

18. The method of claim 11, further comprising:
recognizing the object based on the deep learning network to which the updated parameter is applied.

* * * * *